United States Patent
Suefuji et al.

(10) Patent No.: US 10,075,101 B2
(45) Date of Patent: Sep. 11, 2018

(54) VIBRATION TYPE ACTUATOR

(71) Applicant: CANON KABUSHIKI KAISHA, Tokyo (JP)

(72) Inventors: Kei Suefuji, Tokyo (JP); Takao Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 14/568,030

(22) Filed: Dec. 11, 2014

(65) Prior Publication Data

US 2015/0171773 A1 Jun. 18, 2015

(30) Foreign Application Priority Data

Dec. 16, 2013 (JP) .................................. 2013-259634

(51) Int. Cl.
*H02N 2/10* (2006.01)
*H02N 2/12* (2006.01)
*H02N 2/16* (2006.01)

(52) U.S. Cl.
CPC ............... *H02N 2/12* (2013.01); *H02N 2/163* (2013.01)

(58) Field of Classification Search
CPC .......... H02N 2/12; H02N 2/163; H02N 2/103; H02N 2/10; H02N 2/026
USPC ............. 310/323.02, 323.08, 323.16, 323.18
See application file for complete search history.

(56) References Cited

U.S. PATENT DOCUMENTS

| | | | | |
|---|---|---|---|---|
| 6,288,475 B1* | 9/2001 | Ito | ........................... | H02N 2/147 310/323.01 |
| 6,320,299 B1* | 11/2001 | Kitani | .................... | H02N 2/007 310/323.04 |
| 6,710,516 B1* | 3/2004 | Tamai | .................... | H02N 2/106 310/323.13 |
| 2009/0146530 A1* | 6/2009 | Tang | ..................... | B23B 31/083 310/323.18 |
| 2011/0234041 A1* | 9/2011 | Kanazawa | ............. | H02N 2/006 310/300 |
| 2012/0146460 A1 | 6/2012 | Suefuji | | |
| 2013/0335085 A1* | 12/2013 | Arimitsu | ................ | H02N 2/103 324/318 |

FOREIGN PATENT DOCUMENTS

| | | | |
|---|---|---|---|
| JP | 62-126873 A | 6/1987 | |
| JP | H06-086571 A | 3/1994 | |
| JP | H06-276767 A | 9/1994 | |

(Continued)

*Primary Examiner* — Bryan Gordon
(74) *Attorney, Agent, or Firm* — Canon USA, Inc. I.P. Division

(57) ABSTRACT

A vibration type actuator including a vibrator having an electro-mechanical energy conversion element and an elastic member fixed to the electro-mechanical energy conversion element; a base unit configured to fix the vibrator; a moving body configured to come into press contact with the vibrator and capable of being moved by the vibration; a press member configured to bring the vibrator and the moving body into press contact with each other and transmit a drive force of the moving body to an output unit; and a bearing unit configured to rotatably support the output unit with respect to the base unit, wherein the bearing unit is arranged on an outer peripheral side of the vibrator and the moving body in a direction orthogonal to a direction of rotation axis of the output unit.

17 Claims, 5 Drawing Sheets

(56) References Cited

FOREIGN PATENT DOCUMENTS

| JP | 2001-178160 A | 6/2001 |
| JP | 2012-125070 A | 6/2012 |
| JP | 2013-179734 A | 9/2013 |

* cited by examiner

VIBRATION TYPE ACTUATOR

BACKGROUND OF THE INVENTION

Field of the Invention

This disclosure relates to a vibration type actuator configured to bring a moving body into press contact with a vibrator for frictional drive.

Description of the Related Art

In general, a vibrational wave motor as a type of a vibration type actuator includes a vibrator configured to form a progressive vibrational wave and a moving body configured to come into press contact with the vibrator, and is configured to get a drive force by frictionally driving the vibrator and the moving body with the progressive vibrational wave. Therefore, a contact portion arranged between the vibrator an the moving body comes into and out of contact with the vibrator repeatedly while being deformed in accordance with the vibrations of the vibrator to extract the drive force.

However, when the moving body and the vibrator are directly influenced by an external force from a driven member of the vibration type actuator, contact between the vibrator and the moving body becomes unstable. Consequently, uneven speed and generated force, local abrasion, and a noise, which is referred to as so-called squealing sound, may result.

Therefore, a vibrational wave motor in which an output shaft is fixed by a bearing to resist an influence from an external force is proposed (for example, see Japanese Patent Laid-Open No. 2012-125070, (corresponding U.S. Patent No. 2012/146460)). The vibrational wave motor of this type is illustrated in FIG. 5.

In FIG. 5, a vibrator 102 fixed to a base 101 has a ring shape, and an upper portion of an elastic member 102b is provided with a plurality of projections 102d over an entire circumference thereof.

A piezoelectric ceramics 102a is adhered to a bottom surface of the elastic member 102b with an adhesive agent, and generates a progressive vibrational wave by being applied with two AC voltages having a phase difference by a drive circuit, which is not illustrated, when the motor is driven.

A moving body 103 includes a contact portion 103c having a frictional surface that comes into frictional contact with the projections 102d of the vibrator 102, and is allowed to contact stably with the vibrator 102.

A pressure receiving member 104 and a press member 105 are mounted on an upper surface of the moving body 103. An inner peripheral portion of a press spring 105b of the press member 105 is mounted on a disk 105a thermally inserted onto an output shaft 108 to transmit a drive force of the moving body 103 to the output shaft 108.

The output shaft 108 is rotatably supported by a pair of ball bearings 109a and 109b, and an inner ring of the ball bearing 109a is applied with a pressure by an extent corresponding to a displacement amount of the press spring 105b for bringing the moving body 103 into press contact with the vibrator 102 at an adequate force in advance. Accordingly, rattling of the ball bearing 109a in a radial direction is restrained, and hence swinging of the output shaft 108 in the radial direction may be restrained. The position of a direction of rotation axis of the output shaft 108 is fixed to the pair of ball bearings 109a and 109b. Accordingly, even though the output shaft 108 is subjected to an external force from the driven member in the direction of rotation axis of the vibration type actuator, which is no illustrated, the external force is absorbed by the ball bearings 109a and 109b, and little external force is applied to the vibrator 102 and the moving body 103, whereby stable drive of the vibration type actuator is achieved.

An aspect of this disclosure relates to a vibration type actuator configured to restrain an influence from an external force from a driven member of the vibration type actuator and to allow a reduction in thickness.

SUMMARY OF THE INVENTION

An aspect of this disclosure relates to a vibration type actuator including: a vibrator having an electro-mechanical energy conversion element and an elastic member fixed to the electro-mechanical energy conversion element; a base unit configured to fix the vibrator; a moving body configured to come into press contact with the vibrator and capable of being moved by the vibration; a press member configured to bring the vibrator and the moving body into press contact with each other and transmit a drive force of the moving body to an output unit; and a bearing unit configured to rotatably support the output unit with respect to the base unit, wherein the bearing unit is arranged on an outer peripheral side of the vibrator and the moving body in a direction orthogonal to a direction of rotation axis of the output unit.

Further features of the present invention will become apparent from the following description of exemplary embodiments with reference to the attached drawings.

DESCRIPTION OF THE EMBODIMENTS

A mode for implementing this disclosure will be described with reference to examples given below.

Figure 5:
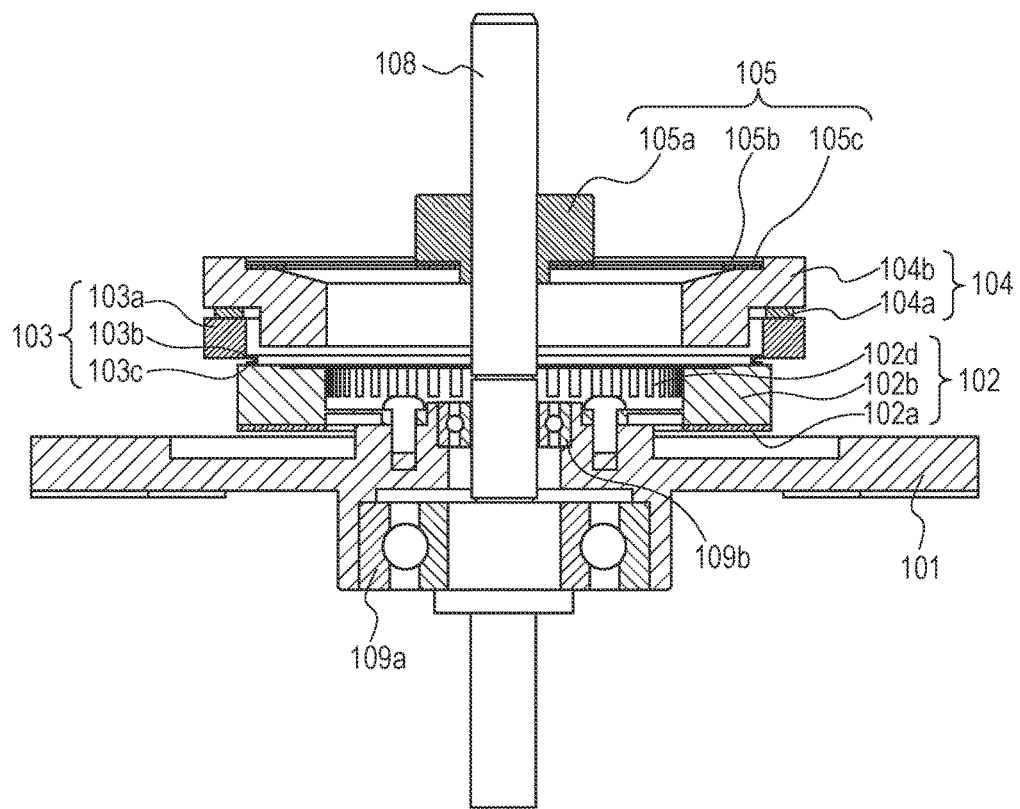
FIG. 5 is an explanatory cross-sectional view illustrating a configuration of a vibration type actuator of the related art.

First of all, in a vibration type actuator having a bearing structure like the related art illustrated in FIG. 5, a ball bearing 109a configured to receive a pressure in advance is arranged on a side opposite to a surface to which a vibrator 102 of a base unit 101 is fixed. Therefore, the ball bearing 109a bears a pressing force, and hence a bearing having a large load rating needs to be used. Consequently, there arises a problem of an increase in size of the vibration type actuator by an extent corresponding to the size of the ball bearing 109a.

In the case where a pressing force of the vibration type actuator is lowered and a bearing having a small load rating is used as the ball bearing 109a in order to reduce the thickness of the vibration type actuator, an output torque is considered to be substantially proportional to the pressing force. Therefore, the output torque of the vibration type actuator is limited.

Example 1

As Example 1, an example of a configuration of a rotary vibration type actuator to which this disclosure is applied will be described with reference to FIGS. 1 and 2.

Figure 1:
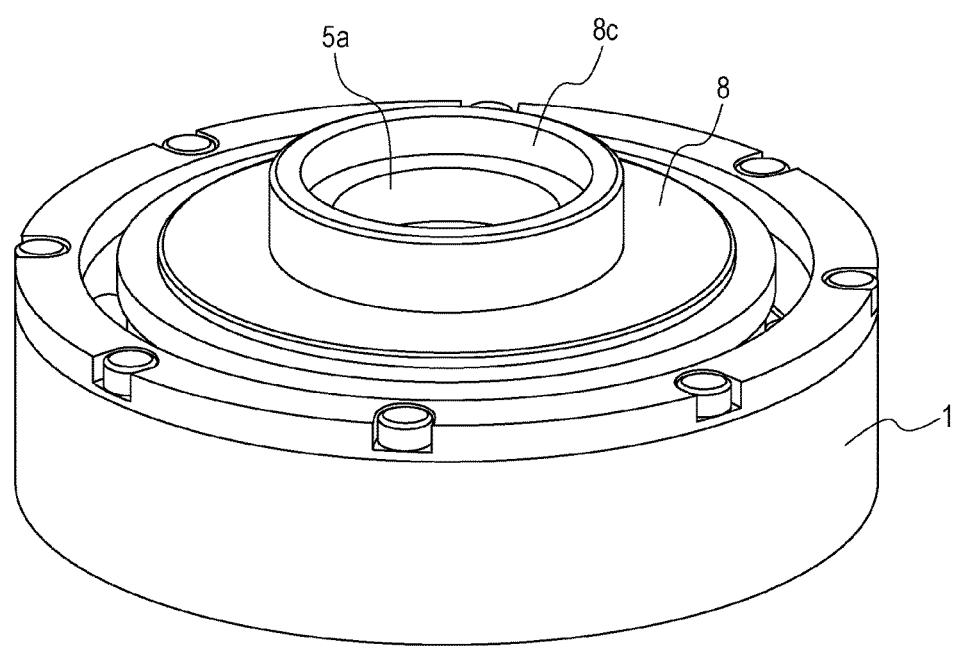
FIG. 1 is an explanatory perspective illustrating a configuration of a vibration type actuator according to Example 1 of this disclosure.

The vibration type actuator of this example is formed into a ring shape as illustrated in FIG. 1. An output deriving portion 8c of an output unit 8 is coupled to a driven member, not illustrated, and brings the driven member into a rotary motion.

Figure 2:
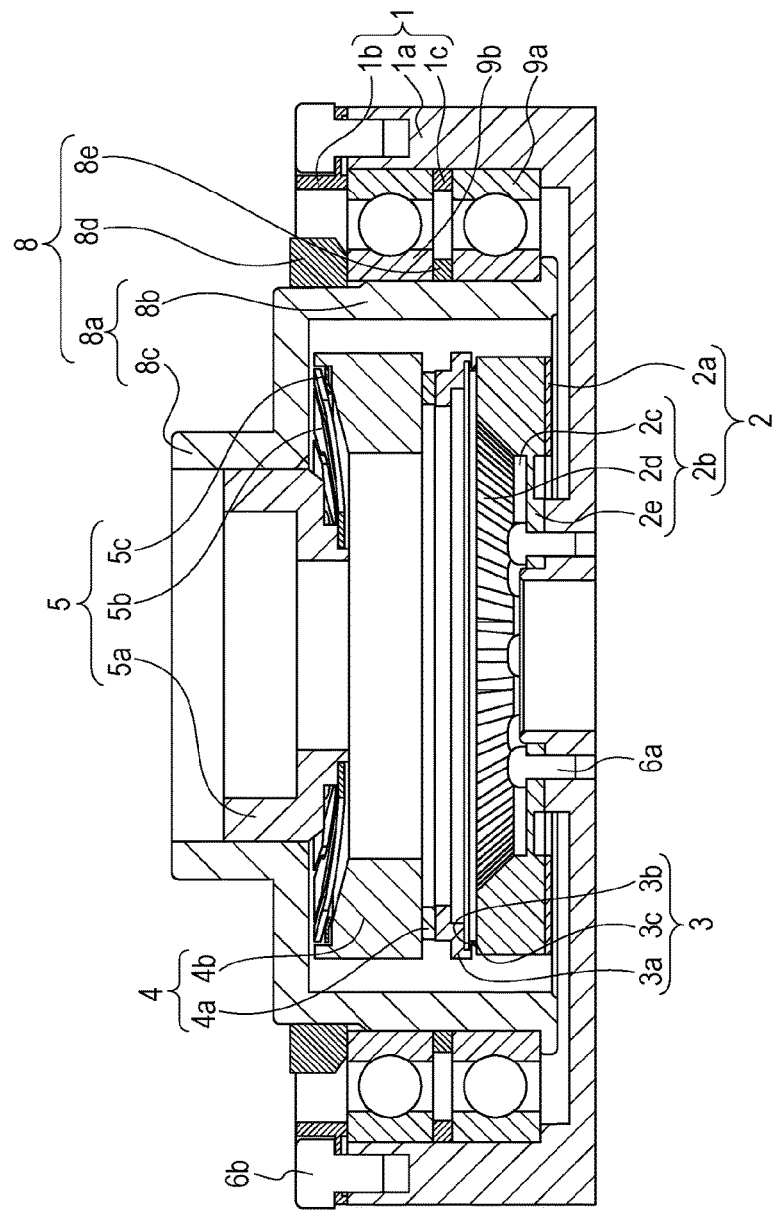
FIG. 2 is a cross-sectional view of the vibration type actuator illustrated in FIG. 1.

FIG. 2 is a cross-sectional view of the vibration type actuator illustrated in FIG. 1.

In FIG. 2, a vibrator 2 includes a piezoelectric element 2a as an electro-mechanical energy conversion element configured to convert a quantity of electricity into a quantity of mechanism, and an elastic member 2b coupled to the piezoelectric element 2a. A drive voltage (AC voltage) is applied to the piezoelectric element 2a, an elliptic motion of the vibrator 2 is caused by a progressive vibrational wave by using a known technology, whereby a moving body 3 and the vibrator 2 are relatively rotated by frictional drive.

The elastic member 2b includes a base portion 2c, a plurality of projection portions 2d, and a flange portion 2e extending from the base portion 2c for fixing the elastic member 2b to the base unit 1. The flange portion 2e is fastened to a base member 1a of a base unit 1 formed into a ring shape by the fixing screw 6a.

The projection portion 2d is arranged concentrically with respect to a center axis of the elastic member 2b along an outer peripheral side of the base portion 2c. Surfaces of the projection portions 2d on the moving body 3 side correspond to sliding surfaces with respect to the moving body 3. The elastic member 2b is a metallic elastic member, and is formed of a stainless steel in this example. As a hardening process for enhancing durability, the sliding surfaces of the projection portions 2d with respect to the moving body 3 are nitrided.

The moving body 3 includes a main body portion 3a, a supporting portion 3b, and a contact portion 3c having a sliding surface in frictional contact with the projection portions 2d of the vibrator 2, all of which are formed of an elastic member having a ring shape. In this example, the moving body 3 is formed of a sintered stainless steel.

The supporting portion 3b and the contact portion 3c are formed to have a thickness having spring properties, and are configured to keep stable contact with the vibrator 2.

A spring receiving member 4 and a press member 5 are mounted on an upper surface of the moving body 3. The spring receiving member 4 includes a damping rubber 4a and a weight member 4b as vibration damping members.

The damping rubber 4a has a ring shape and is formed of butyl rubber or silicone rubber having a high vibration damping performance. The weight member 4b is a ring-shaped elastic member, and is formed of brass in this example. The damping rubber 4a and the weight member 4b serve to restrain an occurrence of needless vibrations of the moving body 3 occurring while driving the vibration type actuator, so that generation of a noise and lowering of an output of the vibration type actuator are prevented.

The press member 5 includes a spring fixing member 5a, a press spring 5b, and a press spring rubber 5c.

The press spring 5b is a radial-shaped leaf spring, and has a thickness which ensures sufficient displacement without exceeding a proof stress against a pressing force. Therefore, a larger displacement in comparison with the disc-shaped leaf spring is achieved in comparison with a disk-shaped leaf spring, and hence a change of the pressing force due to changes of the vibrator 2 and the moving body 3 with time such as abrasion is small. An inner peripheral portion of the press spring 5b is mounted on the ring-shaped spring fixing member 5a thermally inserted onto the output deriving portion 8c of the output unit 8 to transmit a drive force of the moving body 3 to the output unit 8.

The press spring rubber 5c is formed of butyl rubber or chloroprene rubber. An influence on flatness of a surface of the weight member 4b where the press spring rubber 5c is provided is alleviated by elastic deformation of the press spring rubber 5c. Therefore, the pressing force from the press spring 5b is uniformly applied without unevenness in association with the moving body in a direction of rotation, and stable contact with the vibrator 2 and the moving body 3 is maintained.

The output unit 8 includes a bearing mounting portion 8b, an output shaft 8a composed of the output deriving portion 8c, a bearing inner ring cover 8d provided with an inner peripheral portion which engages the output shaft 8a, and a bearing inner ring spacer 8e.

The output shaft 8a is rotatably supported by two ball bearings 9a and 9b each having an inner ring fitting on an outer peripheral portion of the bearing mounting portion 8b formed into a ring shape.

Outer rings of bearings (ball bearing units) 9a and 9b fit on the base member 1a of the base unit 1, and is fixed to the base unit 1 by a bearing outer ring cover 1b and a bearing outer ring spacer 1c.

The inner rings of the ball bearings 9a and 9b are applied with a pressure by an extent corresponding to a displacement amount of the press spring 5b for bringing the moving body 3 into press contact with the vibrator 2 at an adequate force in advance. Accordingly, rattling in a radial direction of the ball bearings 9a and 9b is restrained, and hence swinging of the output shaft 8a in the radial direction may be restrained.

Here, the output shaft 8a is axially supported by the ball bearings 9a and 9b fixed to the base unit 1, and is connected to the moving body 3 which is in frictional contact with the vibrator 2 fixed to the base unit 1 via the press spring 5b. Therefore, if an external force in a direction of rotation axis from the driven member is applied to the output shaft 8a, the ball bearings 9a and 9b arranged between the output shaft 8a and the base unit 1 and the press spring function as parallel springs to bear the external force depending on the stiffness in the direction of rotation axis thereof. The stiffness of the ball bearings 9a and 9b in the direction of rotation axis is significantly higher than the stiffness of the press spring 5b in the direction of rotation axis, and hence most part of the external force is applied to the ball bearings 9a and 9b, so that the external force applied to the press spring 5b is significantly reduced. Therefore, little external force is applied to the sliding surface on which the vibrator 2 and the moving body 3 are in frictional contact, so that stable drive of the vibration type actuator is enabled.

In addition, in this example, the damping rubber 4a is provided on the upper surface of the moving body 3, so that the damping rubber 4a serves as a series spring with the press spring 5b. Therefore, the difference in stiffness in the direction of rotation axis of the ball bearings 9a and 9b with respect to the press spring 5b and the damping rubber 4a is increased, and the external force applied on the sliding surface between the vibrator 2 and the moving body 3 may further be restrained.

In the structure of the related art, there is a problem of increase in size of the vibration type actuator in the direction of rotation axis by an extent corresponding to the size of the ball bearing.

In contrast, in this example, the two ball bearings 9a and 9b are arranged on the outer peripheral side in the direction orthogonal to the direction of rotation axis with respect to the vibrator 2 and the moving body 3. The position in the direction of rotation axis is arranged between a position of a lower surface (a surface on the side opposite to a surface that comes into contact with the moving body) of the piezoelectric element 2a of the vibrator 2 and a position on an upper surface (a surface on the side opposite to the moving body side) of the spring fixing member 5a of the press member 5. Therefore, the ball bearing may be provided without increasing the size of the vibration type actuator in the direction of rotation axis, an influence of an external force from the driven member of the vibration type actuator may be restrained and a reduction in thickness is enabled. In addition, by increasing the diameter of the bearing while maintaining the size of the bearing in the direction of rotation axis, bearings having a large load rating may be used. Accordingly, the durability of the vibration type actuator can be improved without increasing the size of the vibration type actuator in the direction of rotation axis.

The ball bearings 9a and 9b and the bearing mounting portion 8b of the output shaft 8a are arranged on the outer peripheral side of the vibrator 2 and the moving body 3. The base member 1a and the spring fixing member 5a are formed in a ring shape. Accordingly, a hollow area may be secured in the vibration type actuator, so that electric wiring or air wiring for supplying a drive source to the driven member or, in contrast, passage of a sensor signal line from the driven member can be passed through the hollow area.

In addition, the output shaft 8a is connected to the moving body 3 via the damping rubber 4a and the press spring 5b. Therefore, vibrations of the moving body 3 generated during drive of the vibration type actuator is damped by the damping rubber 4a, and insulated in vibration by the press spring 5b, so that the vibrations are restrained from propagating to the ball bearings 9a and 9b. Accordingly, lowering of the bearing life such as fretting abrasion caused by the propagation of vibrations during drive of the moving body 3 may be avoided. The term "fretting" here corresponds to a relative slip in association with repeated frictional force generated at the contact portion by repeated stress applied by an external load in the state in which the two objects are in contact with each other at a certain contact surface pressure. The term "fretting abrasion" is generation of abrasion damage on the contact surface due to the repeated stress applied by fretting.

In this example, the spring fixing member 5a of the press member 5 configured to transmit the drive force of the moving body 3 is configured with a member separate from the output shaft 8a, and is fixed to the output deriving portion 8c by thermal insert. Accordingly, the pressing force of the vibration type actuator may be set by adjusting a fixed position of the spring fixing member 5a in the direction of rotation axis with respect to the output deriving portion 8c at the time of assembly of the vibration type actuator.

If the spring fixing member 5a and the output shaft 8a are integrally formed, the following problem will be generated. The pressing force is determined uniquely at a time point when the vibration type actuator is assembled, and the pressing force varies by being affected by dimensional variation of the components such as the vibrator 2, the moving body 3, and the damping rubber 4a and, consequently, output from the vibration type actuator also varies. In contrast, with the configuration of this example, the pressing force may be adjusted at the time of assembly, so that variations in output of the vibration type actuator may be restrained even though the components of the vibration type actuator have dimensional variations.

In the example, in order to secure the hollow area in the vibration type actuator, the base member 1a, the spring fixing member 5a, and the bearing mounting portion 8b of the output shaft 8a are formed into a ring shape. However, this disclosure is not limited thereto.

For example, in the case where the vibration type actuator is used in an environment in which abrasion powder of the vibration type actuator needs to be prevented from flying in all directions, the base member 1a, the spring fixing member 5a, and the output deriving portion 8c may also be formed in a solid shape. Accordingly, discharge of the abrasion powder out from the vibration type actuator may be reduced, and the environment of usage can be restrained from being affected thereby.

Subsequently, a modification of this example will be described with reference to FIG. 4. Configurations having the same functions as the configurations illustrated in FIG. 2 are denoted by the same reference numerals and detailed description thereof will be omitted.

A difference from the configuration in FIG. 1 is in that a portion protruding perpendicularly with respect to the rotating axis is provided at an end of the bearing mounting portion 8b of the output unit 8 on the vibrator 2 side. There is also a difference in that a detected member 7a of a reflective encoder for detecting the rotational position of the vibration type actuator is mounted on an end surface of the corresponding portion.

The detected member 7a is formed of a ring-shaped resin film, is fixed to the bearing mounting portion 8b with an adhesive agent, and rotates integrally with the output shaft 8a. A slit is printed on a surface on the side opposite to the fixing surface.

Detectors 7b and 7c of the encoder are provided on the base member 1a of the base unit 1 at positions opposite to the detected member 7a at an interval of 180 degrees in the direction of rotation. By providing two of the detectors 7b and 7c at an interval of 180 degrees, detection error due to a deviation of the detected member 7a may be reduced.

Here, the output shaft 8a is axially supported by the ball bearings 9a and 9b fixed to the base unit 1, and is connected to the moving body 3 which is in frictional contact with the vibrator 2 fixed to the base unit 1 via the press spring 5b. Therefore, even though the vibrator 2 and the moving body 3 are abraded due to a long term drive of the vibration type actuator and the upper surface of the moving body 3 approaches the vibrator 2, only the amount of displacement of the press spring 5b is changed, and the positions of the spring fixing member 5a and the output shaft 8a in the direction of rotation axis do not change. Therefore, an amount of gap, which corresponds to the distance between the detected member 7a of the encoder fixed to the output shaft 8a and the detectors 7b and 7c of the encoder in the direction of rotation axis does not change, and hence an adequate amount of gap may be maintained. Accordingly, a signal from the encoder may be extracted stably, and even though the vibration type actuator is driven for a long time, lowering of the positional accuracy can be restrained.

In the case where the detected member and the detector of the encoder are arranged in series in the direction of rotation axis with respect to a driving portion of the vibration type actuator, there arises a problem that the vibration type actuator is increased in size in the direction of rotation axis by an amount corresponding to the sizes of the detected member and the detector of the encoder.

Figure 4:
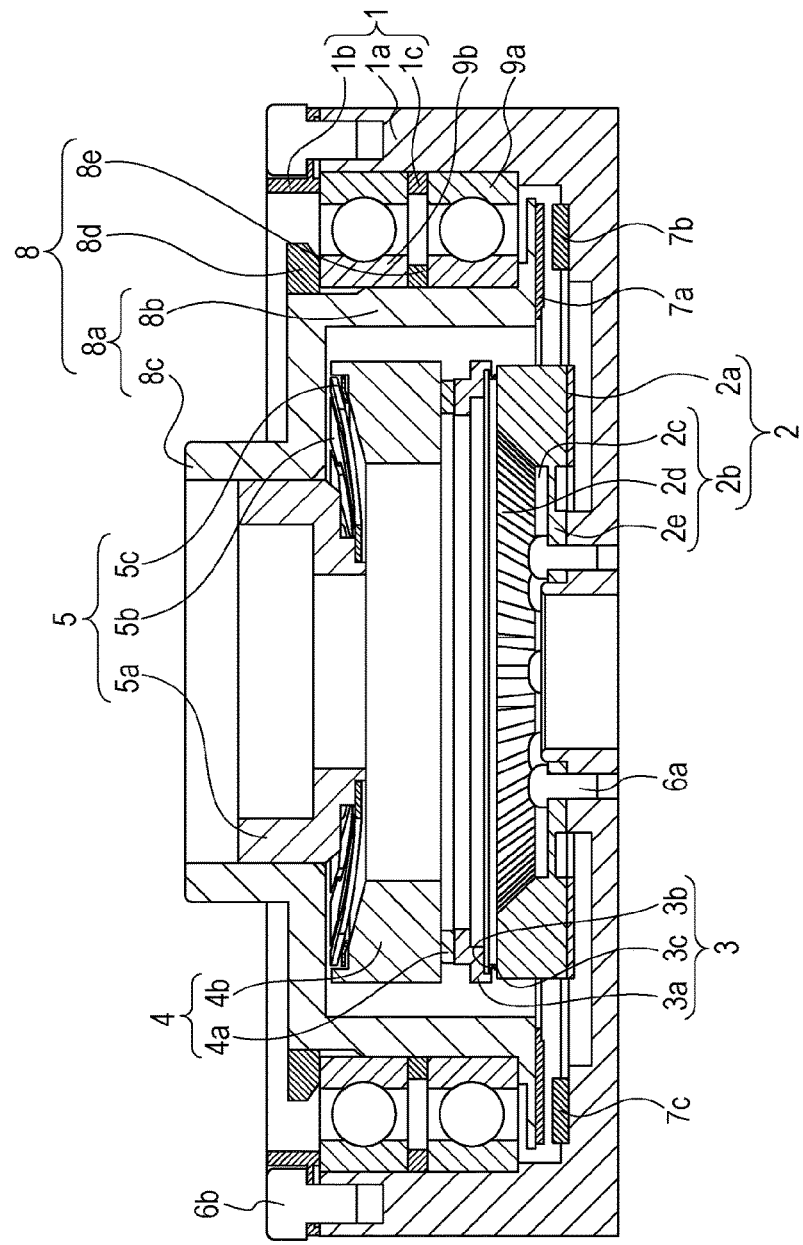
FIG. 4 is an explanatory cross-sectional view of a modification of the vibration type actuator according to Example 1 of this disclosure.

In contrast, in the configuration illustrated in FIG. 4, the detected member 7a and the detectors 7b and 7c are arranged on the outer peripheral side in the direction orthogonal to the direction of rotation axis with respect to the vibrator 2 and the moving body 3. The position in the direction of rotation axis is arranged between a position of the lower surface (the surface on the side opposite to a surface that comes into contact with the moving body) of the piezoelectric element 2a of the vibrator 2 and a position on the upper surface (the surface on the side opposite to the moving body side) of the spring fixing member 5a of the press member 5. Therefore, the encoder may be provided without increasing the size of the vibration type actuator in the direction of rotation axis, lowering of the positional accuracy of the vibration type actuator may be restrained and a reduction in thickness is enabled.

In addition, by arranging the detected member 7a of the encoder on the outer peripheral side of the vibrator 2 and the moving body 3 in the direction orthogonal to the direction of rotation axis, the diameter of the detected member as a ring-shaped scale is increased to allow an increase in number of slits. Accordingly, the resolution of the encoder may be enhanced without changing the detectors 7b and 7c, so that the positional accuracy of the vibration type actuator can be improved.

In addition, the output shaft 8a is connected to the moving body 3 via the damping rubber 4a and the press spring 5b. Therefore, vibrations of the moving body 3 generated during drive of the vibration type actuator is damped by the damping rubber 4a, and insulated in vibration by the press spring 5b, so that the vibrations are restrained from propagating to the detected member 7a of the encoder. Accordingly, the encoder signal is prevented from becoming unstable by the propagation of the vibration of the moving body 3 being driven and, consequently, lowering of the positional accuracy of the vibration type actuator may be avoided.

Although the reflective detected member 7a and the detectors 7b and 7c are employed as the encoder, this disclosure is not limited to such a configuration and, for example, the detected member and the detector of the transmissive encoder may be used. In this manner, with the configuration of the vibration type actuator described in this example, the influence of an external force from the driven member may be restrained and the vibration type actuator in which a reduction in thickness is enabled is achieved.

Example 2

Figure 3:
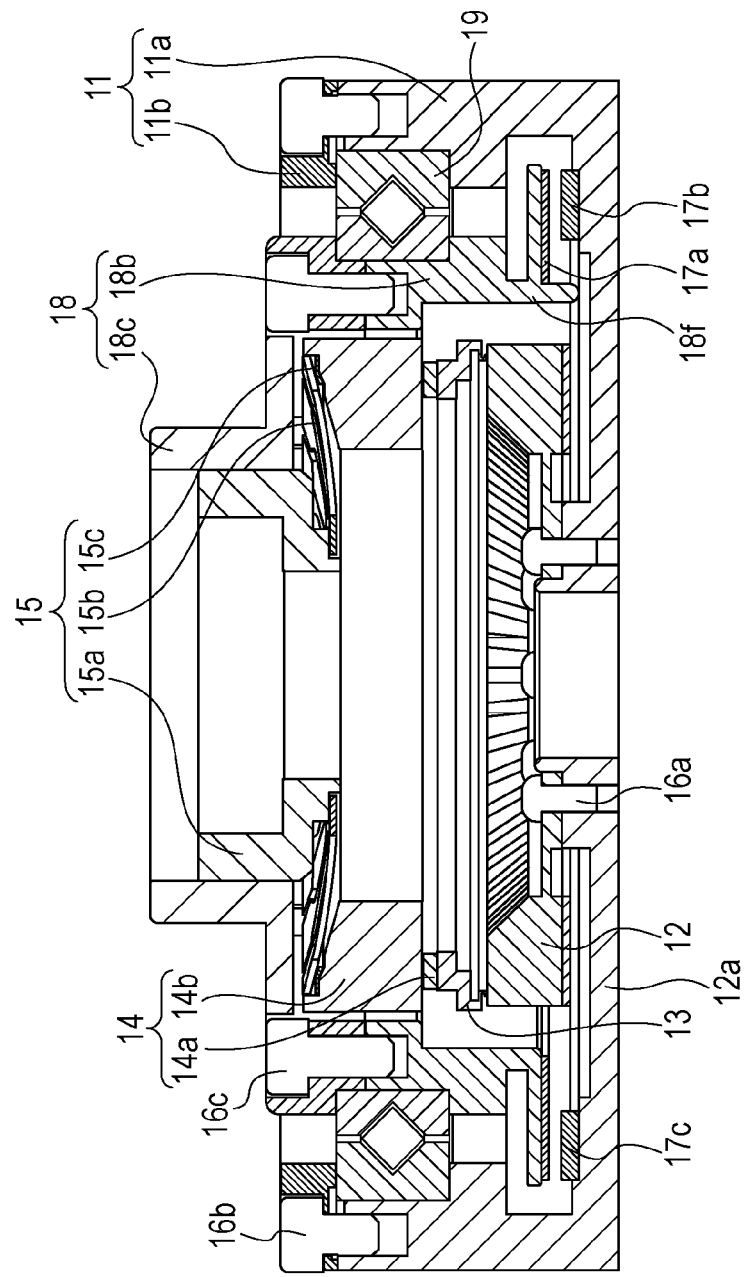
FIG. 3 is an explanatory cross-sectional view illustrating a configuration of a vibration type actuator according to Example 2 of this disclosure.

As Example 2, an example of the configuration of a vibration type actuator of a mode different from Example 1 will be described with reference to FIG. 3. This example is different from the structure of Example 1 in that the bearing and the output unit are configured as illustrated in FIG. 3. Other elements (a vibrator and a moving body) of this example are the same as corresponding structures in Example 1, and hence description will be omitted while assigning the same ones place digits.

An output unit 18 includes a bearing mounting portion 18b, an output deriving portion 18c, and a cover portion 18f formed into a ring shape, and are rotatably supported by an inner ring of a so-called cross-roller bearing 19 in which rollers are arrayed between an inner ring and an outer ring of the bearing in the orthogonal direction. The bearing mounting portion 18b and the output deriving portion 18c are fastened so as to rotate integrally by a fixing screw 16c.

An outer ring of the bearing 19 fits on the base member 11a of the base unit 11, and is fixed to the base unit 11 by a bearing outer ring cover 11b.

A detected member 17a as a scale of a reflective encoder for detecting the rotational position of the vibration type actuator is mounted on a surface of the bearing mounting portion 18b of the output unit 18 on a vibrator 12 side. The detected member 17a is formed of a ring-shaped resin film, is secured to the bearing mounting portion 18b with an adhesive agent. Since an inner peripheral portion of the detected member 17a is formed so as to fit on an outer peripheral portion of the cover portion 18f of the output unit 18, the output unit 18 and the detected member 17a may be mounted at a high coaxiality without using a jig at the time of assembly.

The detectors 17b and 17c of the encoder are provided on the base member 11a of the base unit 11 at positions opposite to the detected member 17a at an interval of 180 degrees in the direction of rotation. By providing two of the detectors 17b and 17c at an interval of 180 degrees, detection error due to a deviation of the detected member 17a may be reduced.

In this example as well, the output unit 18 is axially supported by the cross-roller bearing 19 fixed to the base unit 11, and is connected to a moving body 13 which is in frictional contact with the vibrator 12 fixed to the base unit 11 via a press spring 15b. Therefore, if an external force in the direction of rotation axis from the driven member is applied to the output unit 18, the cross-roller bearing 19 arranged between the output unit 18 and the base unit 11 and the press spring 15b function as parallel springs to bear the external force depending on the stiffness in the direction of rotation axis thereof. The stiffness of the cross-roller bearing 19 in the direction of rotation axis is significantly higher than the stiffness of the press spring 15b in the direction of rotation axis, and hence most part of the external force is applied to the cross-roller bearing 19, so that the external force applied to the press spring 15b is significantly reduced. Therefore, little external force is applied to the sliding surface on which the vibrator 12 and the moving body 13 are in frictional contact, so that stable drive of the vibration type actuator is enabled.

A damping rubber 14a is configured to act as a series spring together with the press spring 15b, whereby a difference in stiffness of the cross-roller bearing 19 with respect to the press spring 15b and the damping rubber 14a in the direction of rotation axis is increased to further restrain an external force applied to the sliding surface.

In addition, even though the vibrator 12 and the moving body 13 are abraded due to a long term drive of the vibration type actuator and an upper surface of the moving body 13 approaches the vibrator 12, only an amount of displacement of the press spring 15b is changed, and the positions of a spring fixing member 15a and the output unit 18 in the direction of rotation axis do not change. Therefore, an amount of gap between the detected member 17a of the encoder fixed to the output unit 18 and the detectors 17b and 17c of the encoder does not change, and hence an adequate amount of gap may be maintained. Accordingly, a signal from the encoder may be extracted stably, and even though the vibration type actuator is driven for a long time, lowering of the positional accuracy can be restrained. Furthermore, vibrations of the moving body 13 generated during drive of the vibration type actuator are restrained from propagating to the detected member 17a of the encoder by actions of the damping rubber 14a and the press spring 15b.

In this example, the cross-roller bearing 19 is arranged on the outer peripheral side in the direction orthogonal to the direction of rotation axis with respect to the vibrator 12 and the moving body 13. The position in the direction of rotation axis is arranged between a position of a lower surface (a surface on the side opposite to a surface that comes into contact with the moving body) of a piezoelectric element 12a of the vibrator 12 and a position on an upper surface (a surface on the side opposite to the moving body side) of the spring fixing member 15a of a press member 15. Therefore, the ball bearing may be provided without increasing the size of the vibration type actuator in the direction of rotation axis, an influence of an external force from the driven member of the vibration type actuator may be restrained and a reduction in thickness is enabled.

In this example, the detected member 17a and the detectors 17b and 17c of the encoder are arranged on the outer peripheral side in the direction orthogonal to the direction of rotation axis with respect to the vibrator 12 and the moving body 13. The position in the direction of rotation axis is arranged between a position of the lower surface (the surface on the side opposite to the surface that comes into contact with the moving body) of the piezoelectric element 12a of the vibrator 2 and a position on the upper surface (the surface on the side opposite to the moving body side) of the spring fixing member 15a of the press member 15. Therefore, the encoder may be provided without increasing the size of the vibration type actuator in the direction of rotation axis, lowering of the positional accuracy of the vibration type actuator may be restrained, and a reduction in thickness is enabled.

Furthermore, in this example, with the bearing composed of the cross-roller bearing 19, the output unit 18 is axially supported by one bearing with high stiffness. Accordingly, in comparison with the case where the two ball bearings are used, a reduction in weight of the vibration type actuator is enabled, so that an improvement of the controllability of the apparatus including the vibration type actuator integrated therein is achieved. In addition, the detected member 17a of the encoder may be provided in the space in which the two ball bearings have been provided, so that the detection of rotation is enabled without increasing the size of the vibration type actuator for providing an additional encoder in the exterior of the vibration type actuator.

The base member 11a and the spring fixing member 15a are formed in a ring shape. Accordingly, a hollow area can be secured in the vibration type actuator.

Furthermore, since the output unit 18 is connected to the moving body 13 via the damping rubber 14a and the press spring 15b, vibrations of the moving body 13 generated during drive of the vibration type actuator are restrained from propagating to the cross-roller bearing 19 and the detected member 17a of the encoder. Accordingly, lowering of the bearing life such as fretting abrasion caused by the propagation of vibrations during drive of the moving body 13 may be avoided. In addition, the encoder signal is prevented from becoming unstable by the propagation of the vibration of the moving body 13 during drive and, consequently, lowering of the positional accuracy of the vibration type actuator may be avoided.

Furthermore, in this example, the cover portion 18f of the output unit 18 extends in the direction of rotation axis, and extends beyond the surface opposing to the detected member 17a of the detectors 17b and 17c toward the base member 11a side. Accordingly, even though abrasion powder is generated from the vibrator 12 and the moving body 13 by a long term drive of the vibration type actuator, the abrasion powder is adhered to the bearing mounting portion 18b of the output unit 18 and an inner peripheral surface of the cover portion 18f. Therefore, the amount of the abrasion powder flying to the detected member 17a and the detectors 17b and 17c of the encoder may be reduced, and lowering of the positional accuracy can be restrained even though the vibration type actuator is driven for a long term.

As described thus far, with the configurations of the respective examples of this disclosure, the influence of the external force from the driven member of the vibration type actuator may be restrained and the vibration type actuator in which a reduction in thickness is enabled is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-259634 filed Dec. 16, 2013, which is hereby incorporated by reference herein in its entirety.

What is claimed is:

1. A vibration type actuator comprising:
   a vibrator comprising an electro-mechanical energy conversion element and an elastic member fixed to the electro-mechanical energy conversion element;
   a base unit configured to fix the vibrator;
   a body configured to come into press contact with the vibrator;
   a press member configured to bring the vibrator and the body into press contact with each other;
   an output unit to which a drive force of the body is transmitted through the press member; and
   a bearing unit configured to rotatably support the output unit with respect to the base unit,
   wherein the vibrator and the body are rotated relatively to each other about a rotation axis by a vibration of the vibrator,
   wherein the bearing unit is arranged on an outer peripheral side of the vibrator and the body in a direction orthogonal to the rotation axis,
   wherein the press member includes a press spring configured to generate a pressing force, and a spring fixing member configured to mount the press spring, and
   wherein an outer peripheral portion of the spring fixing member is fixed to an inner peripheral portion of the output unit.

2. The vibration type actuator according to claim 1, wherein the bearing unit is arranged, in the direction of rotation axis of the output unit, between a position of a surface of the vibrator on a side opposite to a surface which comes into contact with the body and a position of a surface of the press member on a side opposite to a surface where the body is provided.

3. The vibration type actuator according to claim 1, wherein the output unit has a ring-shaped bearing mounting portion, an outer peripheral portion of the bearing mounting portion is rotatably supported by an inner ring of a ball bearing, and an inner peripheral portion of the bearing mounting portion is provided on an outer peripheral side of the vibrator and the body in the direction orthogonal to the direction of rotation axis of the output unit.

4. The vibration type actuator according to claim 1, wherein the press member includes a press spring configured to be deformed in the direction of rotation axis to generate a pressing force, and stiffness of the bearing unit in the direction of rotation axis is larger than stiffness of the press spring in the direction of rotation axis.

5. The vibration type actuator according to claim 1, wherein the press spring is configured to be deformed in the direction of rotation axis to generate a pressing force.

6. The vibration type actuator according to claim 1, wherein a vibration damping member is provided between the body and the press member.

7. The vibration type actuator according to claim 1, wherein the press member and the bearing unit arranged so as to act as parallel springs on the output unit in the direction of rotation axis of the output unit.

8. The vibration type actuator according to claim 1, wherein the bearing unit is the ball bearing or a cross-roller bearing.

9. The vibration type actuator according to claim 1, further comprising an encoder configured to detect a position of rotation of the vibration type actuator, wherein a detected member of the encoder is provided on the output unit, and wherein a detector of the encoder is provided on the base unit at a position opposing the detected member.

10. The vibration type actuator according to claim 9, wherein the detected member and the detector of the encoder are arranged on the outer peripheral side of the vibrator and the body in the direction orthogonal to the direction of rotation axis of the output unit.

11. The vibration type actuator according to claim 10, wherein the detected member of the encoder is arranged between a position of a surface of the vibrator on a side opposite to the surface which comes into contact with the body and a position of a surface of the press member on a side opposite to the surface where the body is provided.

12. The vibration type actuator according to claim 10, wherein the detector of the encoder is arranged between a position of the surface of the vibrator opposite to the surface which comes into contact with the body and a position of the surface of the press member on a side opposite to the surface where the body is provided.

13. The vibration type actuator according to claim 1, wherein the output unit includes a ring-shaped bearing mounting portion which is disposed between the body and the bearing unit in the direction orthogonal to the rotation axis.

14. The vibration type actuator according to claim 1, wherein an elliptic motion of the vibrator is caused by applying a drive voltage to the electro-mechanical energy conversion element whereby the body and the vibrator are rotated relatively to each other.

15. The vibration type actuator according to claim 1, wherein the spring fixing member and the output unit have a hollow area, and the hollow area exists in the direction of rotation axis.

16. The vibration type actuator according to claim 1, wherein the base unit, the vibrator, and the body have a hollow area, and the hollow area exists in the direction of rotation axis.

17. The vibration type actuator according to claim 9, wherein the output unit includes a cover portion that extends in the direction of rotation axis of the output unit, and extends beyond a surface opposing to the detected member of the encoder toward the base unit.

* * * * *